INVENTORS
FRANZ BRUGGER
JÜRGEN PAUL

United States Patent Office 3,674,319
Patented July 4, 1972

3,674,319
SAFETY CIRCUIT FOR A BRAKE-FORCE CONTROL INSTALLATION INTENDED FOR VEHICLES, ESPECIALLY FOR MOTOR VEHICLES
Franz Brugger and Jurgen Paul, Stuttgart, Germany, assignors to Daimler-Benz Aktiengesellschaft, Stuttgart-Unterturkheim, Germany
Filed Dec. 11, 1970, Ser. No. 97,244
Claims priority, application Germany, Dec. 12, 1969, P 19 62 322.4
Int. Cl. B60t 8/06
U.S. Cl. 303—21 CG 15 Claims

ABSTRACT OF THE DISCLOSURE

A safety circuit for a brake force control installation intended for vehicles, particularly motor vehicles, in which a pulse transmitter is associated with each wheel that produces at least one signal in case of excessive deceleration and predetermined reacceleration that are combined in an electronic circuit and serve for the control of the control elements associated with the wheel brakes; a safety relay is arranged in series with the control relay, controlled by the electronic circuit, for the control element, whereby the safety relay is normally closed when de-energized and opens up when energized; the control of the safety relay takes place by way of two timing elements, whereby the first timing element is controllable by way of the control of the corresponding control element itself while the second timing element is controlled by a pulse that results from the electronic combination of the deceleration and reacceleration signals, the response time of the two timing elements is greater than the longest normally occurring control period.

---

Figure 1:
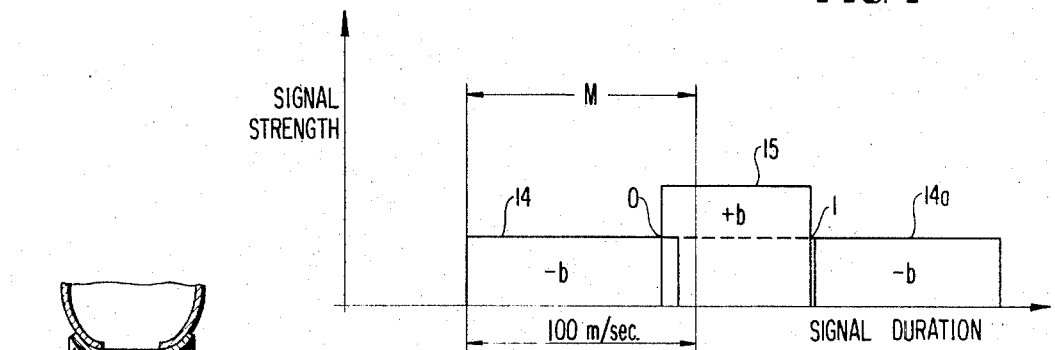

The present invention relates to a safety circuit in a brake force control installation intended for vehicles, especially for motor vehicles, in which a pulse-transmitter is coordinated to each wheel, which supplies at least one signal with an excessive deceleration (minus $b$) and with a predetermined reacceleration (plus $b$), which are combined in an electronic circuit and serve for the control of control elements coordinated to the wheel brakes, for example, of the magnetic valves.

With known, prior art brake force control installations of the aforementioned type, the pulse transmitter operates with two inertia masses, one of which controls the deceleration pulse (minus $b$) and the other of which controls the reacceleration pulse (plus $b$) by contact-making. The pressure in the brake circuit of the respective wheel or over-all is modulated by means of these pulses by way of an electronic circuit and with the aid of pressure control units that essentially consist of magnetic or solenoid valves.

This prior art control of the brake slippage by modulation of the brake pressure entails the disadvantage that in case of a fault or defect in the installation, under certain circumstances the normal vehicle brake is not available to the driver in the customary manner. These possible faults or defects may have their origin in the mechanical or the electrical aggregates or units, especially, for example, also in the pulse transmitters. On the other hand, faults or defects in the pressure control units or in the return feed pump generally do not lead to a failure of the brake.

The present invention is concerned with the task to eliminate the electrical faults and errors by a safety circuit. In that connection, all error signals possibly transmitted by the pulse transmitters—and more particularly those as a result of mechanical defects and/or of a rotational speed behavior not corresponding to the control—have to be detected as well as also the errors occurring in the signal transmission and in the electronic circuit. This control system then has to be turned off if such errors occur prior to the braking or also during the braking itself.

As a solution to the underlying problems, the present invention starts with the general concept that with a digital indication of the deceleration or acceleration of a brake-slippage-controlled wheel, a constant contact-closing on the basis of an erroneous signal transmission can be differentiated from a correct signal only by a time measurement. In particular, the present invention therefore proposes with the installations of the aforementioned type that a safety relay is arranged in series with the control relay for the control element adapted to be energized by the electronic circuit, which saftety relay is normally closed and which drops out or opens in case of energization, and in that the energization thereof is controllable by way of a first timing element by the control of the respective control element itself and by way of a second timing element by way of a pulse that results from the electronic circuit connection producing a combination of the deceleration and acceleration signal (minus $b$ and plus $b$) and that the response time of the two timing elements lies above the longest normally occurring control period or switching time.

The safety circuit according to the present invention entails the advantage that the control system is turned off if, prior to the braking, i.e., after engagement of the ignition in the driving operation, an error occurs such as, for example, a continuous signal, an under-voltage, a failure or drop in current, etc. Furthermore, the control system is rendered inoperable, i.e., is turned off at an earliest possible moment as soon as a control signal results in the electronic circuit for any reason whatsoever during the braking which exceeds a maximum possible duration during normal control. After the turning off of the control system, the normal brake is then available to the driver.

A further feature of the present invention resides in that the first timing element has a considerably longer response time—approximately 600 milliseconds—than the second timing element whose response time—approximately 150 milliseconds—corresponds to the maximum time during normal operation. The maximum time is thereby so determined that it is larger by a slight amount than the longest technically occurring duration of time.

Conditions are possible according to which the signal of the reacceleration incorporates in its strength in the signal of the wheel deceleration. This has to be additionally taken into consideration by the safety circuit because otherwise a reacceleration signal, correct as to control, which may be present already 150 milliseconds after the beginning of the deceleration signal, leads to the response of the safety circuit. For that purpose, such a circuit connection of the deceleration and reacceleration signal (minus $b$ and plus $b$) is proposed according to the present invention that the time-counting starts with the beginning of the deceleration signal and that an occurrence of the reacceleration signal interrupts an already running time-counting and that a new time-counting starts when the reacceleration signal is extinguished in the presence of a deceleration signal. In this manner, the correct control situations can be differentiated quite clearly by the safety installation of the present invention from the erroneous or incorrect situations.

In particular, it is proposed in that connection that the input of the second timing element is connected with the output of an AND element whose first input is connected with a line carrying the deceleration signal and whose second input is operatively connected by way of a NOT element with a line carrying the reacceleration signal. On the other hand, according to the present invention, the first timing element is connected with its input to the energizing circuit of the corresponding control unit, for example, of the magnetic valve.

Finally, a further feature of the present invention resides in that the output of the first and second timing element is connected with the energizing coil of the safety relay by way of an amplifier element.

Accordingly, it is an object of the present invention to provide a safety circuit for a brake force control installation which avoids by simple means the aforementioned shortcomings and drawbacks encountered in the prior art.

Another object of the present invention resides in a safety circuit for a brake force control installation operating electronically according to the digital principle which assures the availability of the normally operating brake system in case of a defect in the brake force control installation.

A further object of the present invention resides in a safety circuit which automatically turns off the brake force control system in case of a defect either prior to the braking or during the braking itself.

Still a further object of the present invention resides in a safety circuit of the type described above which not only assures the earliest possible turning off of the control system in case of a faulty signal but is capable of clearly differentiating between correct control situations and incorrect control situations.

Figure 2:
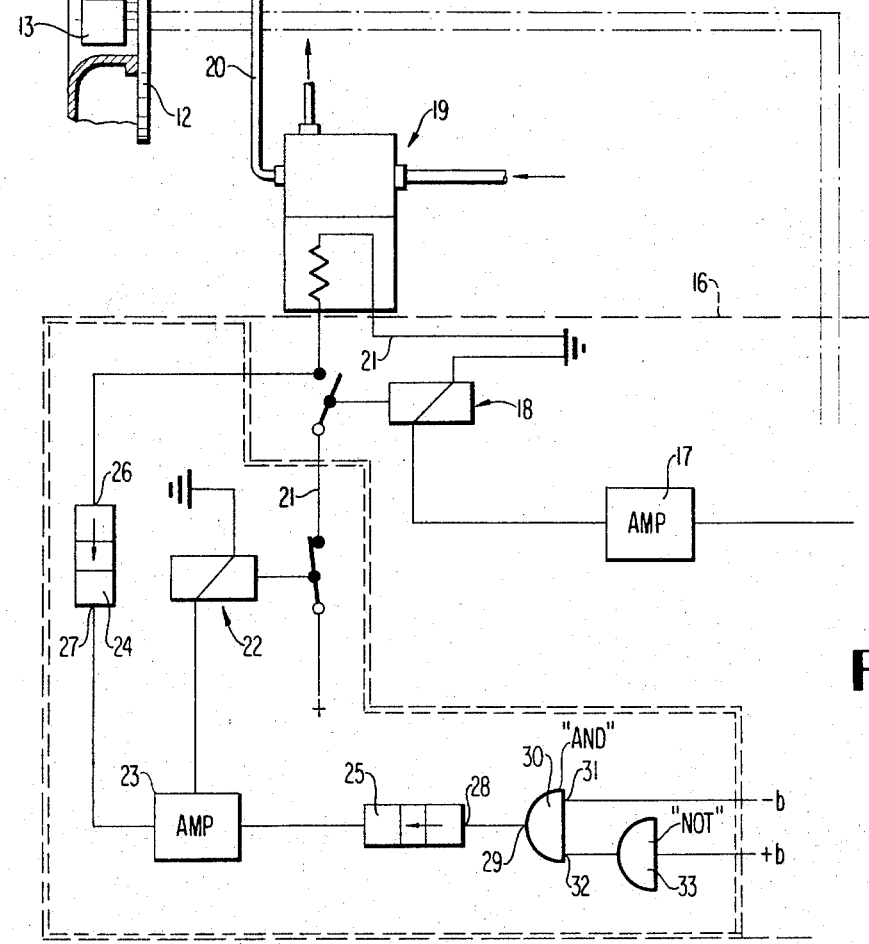

These and further objects, features and advantages of the present invention will become more obvious from the following description when taken in connection with the accompanying drawing which shows, for purposes of illustration only, one embodiment in accordance with the present invention, and wherein:

FIG. 1 is a schematic diagram of the pulses occurring in a brake force control system for explaining the operation of the safety circuit of the present invention; and FIG. 2 is a partial schematic view of the safety circuit in accordance with the present invention.

Referring now to the drawing, according to FIGS. 1 and 2, a disk brake 11 with a brake disk 12 and a pulse transmitter 13 is coordinated to each wheel 10 of the vehicle which is indicated only schematically. The pulse transmitter 13 which is of conventional construction is also only schematically indicated as to its arrangement. The pulse transmitter 13 produces in a conventional manner—see FIG. 1—pulses 14, 14a, etc. for the wheel deceleration and pulses 15, etc. for the reacceleration. These pulses are fed to an electronic circut 16 in a conventional manner which connects and combines the pulses in a predetermined manner and which controls by way of an amplifier 17 and a control relay generally designated by reference numeral 18 the control unit of the respective wheel brake. Since the electronic circuit 16 as well as its circuit details are known as such and form no part of the present invention, a detailed showing thereof is dispensed with herein. The pressure in the brake line 20 is modulated corresponding to the wheel behavior characterized by the pulses by means of the control unit 19 which is indicated for the sake of simplicity merely as a valve and which in reality may consist of two or even more magnetic valves.

A safety relay generally designated by reference numeral 22 is connected in the energizing circuit 21 of the control unit 19 in series with the control relay 18. The safety relay 22 is also controlled by way of an amplifier 23 from a first timing element 24 and a second timing element 25. Since these timing elements may be of any conventional, commercially available type, a detailed description thereof is also dispensed with herein. The safety relay 22 is normally closed and drops off or opens as soon as a pulse is supplied to the same from the aforementioned timing elements. The first timing element 24 has a relatively long running time and is connected with its input 26 to the energizing circuit 21 of the control unit 19, i.e., the time element 24 operates or runs as long as the energizing circuit 21 is energized. If this energization lasts longer than the response time of the timing element 24, then a pulse appears at the output 27 thereof which causes the safety relay 22 to open by way of the amplifier 23. As a result thereof, the energizing circiut 21 is interrupted and the control unit drops off, i.e., it passes over into the normal condition. In this manner, the brake force control installation is turned off during the normal operation, i.e., without braking, as soon as an error or fault occurs in the same.

During the braking operation, naturally, a considerably more rapid turning off must take place in order that the normally functioning brake is available again to the driver instantaneously. Certain time durations for the control or switching pulses have now been derived from measurements and calculations so that by considering a certain safety factor the maximum time during which the safety circuit should respond, can be determined to a relatively slight value, for example, to the time period of 150 milliseconds. This means that the safety relay 22 has to be caused to drop off already after 150 milliseconds. This is achieved again by way of the amplifier 23 by the timing element 25 which has a running time of 150 milliseconds.

According to FIG. 1, it may now happen that a first deceleration signal 14 does not reach the maximum time period M because prior to its course already a stronger reacceleration signal 15 is present which at the moment of the lapse of the maximum period M overlaps the deceleration signal. Such a control behavior, however, would be completely normal and would cause the safety installation to respond improperly—insofar as a corresponding cancellation is not undertaken at the timing element 25.

In order to avoid the same and to assure that the two signals can be differentiated, the input 28 of the timing element 25 is connected with the output 29 of an AND element 30. The first input 31 of the AND element 30 is connected with a line that carries the deceleration signal. The other input 32 is connected by way of a NOT element 33 with a line that carries the reacceleration signal.

OPERATION

The operation of the safety circuit in accordance with the present invention is as follows:

If the deceleration pulse—for example, the pulse 14 according to FIG. 1—occurs alone, then a pulse results at the two inputs 31 and 32 of the AND element as a result of the NOT element 33 and consequently also at the output thereof so that the timing element 25 starts to run and causes the safety relay 22 to drop off after the predetermined maximum period M by a corresponding pulse. If, in contradistinction thereto, a reacceleration pulse 15 occurs in addition to the pulse 14 (see FIG. 1) then the pulse is extinguished at the output of the NOT element 33 as a result thereof no pulse occurs any longer also at the output 29 of the AND element 30. The time counting at the timing element 25 is therefore interrupted before a pulse can be produced in the output thereof. The time counting begins again only when a further deceleration pulse 14a is present alone (see FIG. 1). It will then depend on the length of this new pulse whether the safety circuit responds or not.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A safety circuit for a brake force control installation intended for a vehicle, in which a pulse transmitter means is coordinated to each wheel, that produces at least one signal in case of excessive deceleration and in case of predetermined reacceleration, which signals are combined in an electronic circuit means and serve for the control of control means coordinated to wheel brake means, characterized in that a safety relay means which is connected in series with a control relay means for the control means is operable to be energized by the electronic circuit means, said safety relay means being normally closed and opening in case of energization thereof, and further means for controlling the energization of said safety relay means including first timing means operable by the control of the corresponding control means itself and by a second timing means operable by a pulse which results from the electronic combination in said circuit means of the deceleration and reacceleration signals, the response time of the two timing means being greater than the longest normally occurring control period.

2. A safety circuit according to claim 1, characterized in that said control means are solenoid valves.

3. A safety circuit according to claim 1, characterized in that said first timing means has a considerably longer response time than the second timing means whose response time substantially corresponds to the maximum period during normal operation.

4. A safety circuit according to claim 3, characterized in that said first timing means has a response time of about 600 milliseconds while said second timing means has a response time of about 150 milliseconds.

5. A safety circuit according to claim 3, characterized by such a connection of deceleration and reacceleration signals in said electronic circuit means that the time counting starts substantially with the beginning of a deceleration signal and that an appearance of a reacceleration signal interrupts any possibly running time counting, and that a new time counting starts when the reacceleration signal is extinguished in the presence of a deceleration signal.

6. A safety circuit according to claim 5, characterized in that the input of the second timing means is connected with the output of an AND element, whose first input is operatively connected with a line carrying the deceleration signal and whose second input is operatively connected by way of a NOT element with a line carrying the reacceleration signal.

7. A safety circuit according to claim 6, characterized in that the first timing means is connected with its input to the energizing circuit of the corresponding control means.

8. A safety circuit according to claim 7, characterized in that the output of the first and second timing means are connected by way of an amplifier with the energizing coil of the safety relay means.

9. A safety circuit according to claim 8, characterized in that said control means are solenoid valves.

10. A safety circuit according to claim 1, characterized by such a connection of deceleration and reacceleration signals in said electronic circuit means that the time counting starts substantially with the beginning of a deceleration signal and that an appearance of a reacceleration signal interrupts any possibly running time counting, and that a new time counting starts when the reacceleration signal is extinguished in the presence of a deceleration signal.

11. A safety circuit according to claim 10, characterized in that the input of the second timing means is connected with the output of an AND element, whose first input is operatively connected with a line carrying the deceleration signal and whose second input is operatively connected by way of a NOT element with a line carrying the reacceleration signal.

12. A safety circuit according to claim 11, characterized in that the first timing means is connected with its input to the energizing circuit of the corresponding control means.

13. A safety circuit according to claim 10, characterized in that the output of the first and second timing means are connected by way of an amplifier with the energizing coil of the safety relay means.

14. A safety circuit according to claim 10, characterized in that the first timing means is connected with its input to the energizing circuit of the corresponding control means.

15. A safety circuit according to claim 1, characterized in that the output of the first and second timing means are connected by way of an amplifier with the energizing coil of the safety relay means.

References Cited
UNITED STATES PATENTS

| | | | |
|---|---|---|---|
| 3,507,544 | 4/1970 | Wakamatsu et al. | 303—21 CG |
| 3,519,313 | 7/1970 | French et al. | 303—21 BE |

STANLEY H. TOLLBERG, Primary Examiner

U.S. Cl. X.R.

188—151 A